Nov. 3, 1931.                H. C. ELLIOTT                1,830,100
                       MOTOR VEHICLE WHEEL CARRIER
                           Filed July 13, 1927
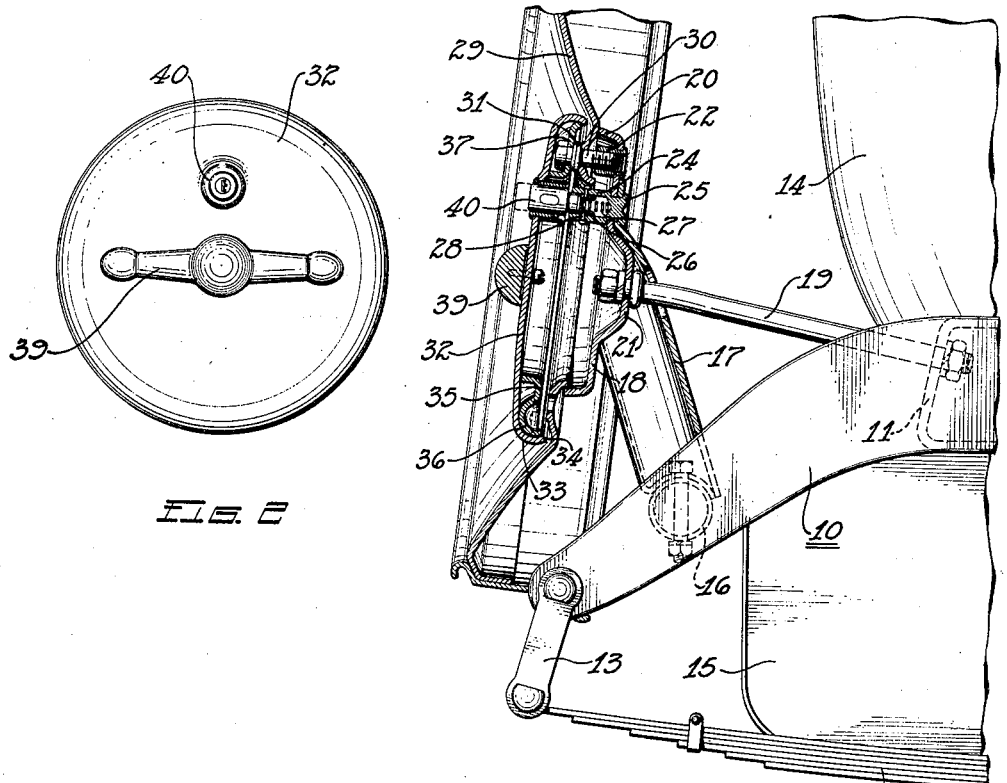
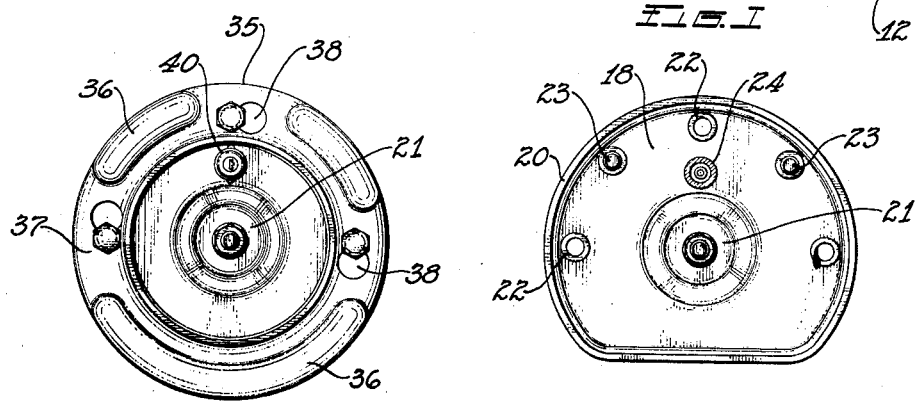
Inventor
HARRY C. ELLIOTT Patented Nov. 3, 1931

1,830,100

UNITED STATES PATENT OFFICE

HARRY C. ELLIOTT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE WHEEL CARRIER

Application filed July 13, 1927. Serial No. 205,473.

This invention relates to motor vehicles and more particularly to supporting and carrying means for extra wheels thereon.

An object of the invention is to provide a wheel carrying means that will be rigid and strong and yet will permit of easy and quick removal and replacement of a wheel.

Another object of the invention is to provide a wheel carrying means including a locking means, the locking means concealed beneath a cover presenting a smooth convex surface to prevent tampering with the lock and the removal of the wheel.

Another object of the invention is to provide a wheel carrying means that will be attractive in appearance, and yet of such structure that a wheel mounted thereon cannot be removed without the use of the proper key for operating the locking mechanism thereof.

A further object of the invention is to provide a wheel carrying means equipped with a locking mechanism having the advantages of a positive support and lock, highly efficient in operation, and yet of marked simplicity as a whole and in respect to each of its component parts so that its manufacture is economically facilitated both as regards to the parts and their assembly.

Other objects of the invention will appear from the following description taken in connection with the drawings, which form a part of this specification, and in which:

Figure 1 is a side elevation of the rear end of a motor vehicle with parts broken away, illustrating the invention as applied, the carrier and wheels supported thereby being shown in section;

Figure 2 is a plan view of the cover;

Figure 3 is a plan view with the cover removed; and

Figure 4 is a plan view of the support.

Referring by numerals to the drawings, 10 represents a side member of a motor vehicle chassis frame and 11 is a rear cross member of the frame. The side member is shown supported by a semi-elliptic spring 12 shackled thereto as indicated at 13. The rear part of a motor vehicle body 14 is shown resting on the frame, and a gasoline tank 15 is suspended from the frame in an approved manner.

A cross member 16 in the form of a tube suitably spaced from the gasoline tank 15 and connecting the rear ends of the side members, provides a very satisfactory support for a bracket 17 upon which is secured a substantially semi-circular support 18 attached to one end of a rod 19, the other end of the rod being connected to the rear cross member 11 of the frame. The bracket 17 and the rod 19 sustains and braces the support 18 at an incline to the perpendicular or in a perpendicular plane according to the type of body mounted on the frame. It is, of course, understood that other means for mounting the support 18, such as a side bracket, may be employed.

The support 18 is cupped or dished to provide a substantially semi-circular flange 20 and a depression 21, the depression being positioned centrally with respect to the flange and of sufficient depth to provide an adequate housing for the nut by means of which the support is secured upon the rod 19. Arranged upon the support adjacent to the flange is a plurality of equally spaced thimbles 22 riveted or otherwise secured in position and interposed between the thimbles in spaced relation thereto are studs or pins 23 likewise riveted in position. The support 18 also carries a cylinder 24 secured in position as indicated at 25, in which position the cylinder projects rigidly from the plate, the cylinder having therein a piston or plunger 26 actuated by a coil spring 27 and limited in its movement by suitable stops 28, the object of which will hereinafter appear.

A wheel 29 is supported by the studs or pins 23 and securely clamped upon the flange 20 by removable bolts 30 threaded in the thimbles 22, the bolts having shoulders or radial flanges 31 which bear against the wheel and which are spaced from the heads of the bolts to provide suitable supporting means for a cover 32. The cover is designed in the form of a convex disk having a flange 33 crimped or turned as indicated at 34 to secure in position a plate 35 swaged as at 36 to lend strength and rigidity thereto and to materially stiffen the cover 32 to which it is secured as a permanent part.

The plate 35 has smooth surfaces 37 intermediate the swaged portions 36 and these smooth surfaces are apertured by spaced key hole slots 38 adapted to register with and to pass over the heads of the bolts 30 and to be turned upon rotation of the cover by its handle 39, to a position where the plate is supported upon the bolts 30 between the heads thereof and the shoulders 31, in which position a lock barrel 40, of the plunger cylinder type, mounted in the wall of the cover 32 registers with the cylinder 24 and engages the cylinder when pushed in flush with the cover 32, in which position the barrel 40 compresses the spring actuated plunger 26 in the cylinder 24, and upon locking the barrel in this position any further movement of the cover is prevented. The spring pressed plunger forces the barrel of the lock outwardly when the barrel is unlocked and also functions as an anti-rattler for the cover when it has been adjusted with the barrel lock in engagement with the plunger.

Although this invention has been described in connection with certain specific embodiments, the principles involved are susceptible of numerous other applications that will readily occur to persons skilled in the art. The invention is therefore to be limited only as indicated by the scope of the appended claims.

Having described the various features of my invention, what I claim as new and desire to secure by Letters Patent is:

1. In combination with a motor vehicle, a wheel carrier comprising a support, means for securing a wheel on said support a cover and a bayonet connection between the cover and the wheel securing means.

2. In combination with a motor vehicle, a wheel carrier comprising a support, means for clamping a wheel on said support, a cover plate, a bayonet connection between the cover plate and the clamping means and means adapted to lock the cover plate against displacement.

3. In combination with a motor vehicle frame, a wheel carrier mounted upon the frame comprising a support and a cover for the support, bayonet connections between the support and cover, and a locking mechanism adapted to secure the cover against displacement.

4. In combination with a motor vehicle frame, a carrier mounted upon the frame comprising a support, means for securing a wheel on the support, a convex cover for the support, bayonet connections between the cover and the wheel securing means, a lock carried by the cover and a catch for said lock carried by the support.

5. In combination with a motor vehicle frame, a carrier mounted upon the frame comprising a support, a plurality of pins upon the support for mounting a wheel, a plurality of bolts for clamping the wheel upon the support, a cover, bayonet connections between the cover and the clamping bolts and means adapted to lock the cover against displacement.

6. The combination with a motor vehicle frame comprising side bars and a cross bar, of a supporting member mounted upon the cross bars, pins for mounting a wheel upon the support member, bolts for clamping the wheel upon the supporting member, a cover plate for the support, bayonet connections between the cover plate and the clamping bolts, and means adapted to lock the cover in place.

7. The combination with a motor vehicle frame comprising side bars and cross bars, of a supporting member mounted upon the cross bars, pins upon the supporting member for receiving a wheel, bolts for clamping the wheel upon the supporting member, a convex cover for the support, bayonet connections between the cover and the clamping bolts, a lock on the cover and a catch for said lock on the support.

8. The combination of a motor vehicle frame comprising side bars and cross bars, of a supporting member mounted upon the cross bars, pins upon the supporting member adapted to receive a wheel, sleeves upon the supporting member, clamping bolts mounted in said sleeves for securing the wheel in position, a cover for the support, bayonet connections between the cover and the clamping bolts, a lock carried by the cover, and a catch for the lock carried by the support.

9. The combination with a motor vehicle frame comprising side bars and cross bars, of a support mounted on the cross bars, said support having a peripheral flange and a plurality of pins normal to the body thereof for the reception of a wheel, a plurality of sleeves mounted upon the support normal to the body thereof, bolts threaded into the sleeves for clamping the wheel upon the support, a cover for the support, bayonet connections between the cover and the bolts, a lock on the cover and a catch for the lock on the support.

In testimony whereof I affix my signature.

HARRY C. ELLIOTT.